Sept. 17, 1968 W. J. TAREN 3,402,401

BALANCED MEMORY DRIVE SENSE SYSTEM

Filed May 13, 1964 2 Sheets-Sheet 1

INVENTOR
WILLIAM J. TAREN

BY Carl C. Kling

ATTORNEY

Sept. 17, 1968 W. J. TAREN 3,402,401

BALANCED MEMORY DRIVE SENSE SYSTEM

Filed May 13, 1964 2 Sheets-Sheet 2

United States Patent Office 3,402,401
Patented Sept. 17, 1968

3,402,401
BALANCED MEMORY DRIVE SENSE SYSTEM
William J. Taren, Poughkeepsie, N.Y., assignor to International Business Machines Corporation, New York, N.Y., a corporation of New York
Filed May 13, 1964, Ser. No. 367,119
3 Claims. (Cl. 340—174)

ABSTRACT OF THE DISCLOSURE

Memory having bit-sense conductors arranged in balanced pairs with a differential sense amplifier such that bit driver voltages appear on both conductors and are cancelled in the differential sense amplifier. Storage elements are formed on two oppositely facing surfaces of conductive substrates. Each conductor of a bit-sense conductor pair is coupled to the storage elements of one substrate surface in a circuit path that includes a first conductor portion positioned along a row of elements, a return path through the conductive substrate, and a second conductor portion positioned along the row of elements.

This invention relates to data storage and in particular to a balanced common bit drive sense system, for a magnetic film memory, which incorporates a conductive substrate in the electrical path.

The bit drive sense system is doubly balanced. Bit drive currents pass through balanced pairs of bit drive conductors and return through conductive substrates. The bit drive currents pass into balanced pairs of sense conductors and terminate through a differential output device to ground. The balanced pairs of bit drive conductors and balanced pairs of sense conductors are balanced with respect to each other, traversing the same pair of rows of bit storage elements.

A selected driver provides a bit drive signal. The bit drive signal divides along two bit drive conductors which make up a balanced pair. One conductor affects a first row of bit storage elements. The other conductor affects a second row of bit storage elements. The bit drive conductors traverse the related rows of bit storage elements and connect to conductive substrate surfaces upon which the bit storage elements are arrayed. The conductive substrate surfaces are connected at the opposite edge to sense conductors which again traverse the rows of bit storage elements. The sense conductors terminate in connections to opposite sides of a differential output amplifier.

The balanced pairs of bit drive conductors and sense conductors, each affecting an equal group of magnetic bit storage elements, connect differentially to the output device for common mode noise rejection. This connection also minimizes the effect of current spreading within the conductive substrate.

*Environment*

The invention operates in a magnetic film storage device. The films are uniaxially anisotropic, i.e., oriented along an "easy axis." The storage device operates by driving single domain magnetic films between two remanent data states, on the easy axis, designated 0 and 1. Data is sensed by driving the films toward a reference state and examining the electrical signals resulting as flux changes occur in the films. In order to switch a magnetic film from 0 to 1 or from 1 to 0, one mode of operation (orthogonal mode) provides a magnetic field transverse to the easy axis (word field) and at the same time provides a magnetic field in one or the other of the data directions along the easy axis (bit field).

Techniques have been known for applying bit current along a conductor and returning that bit current through a conductive substrate (ground plane) to provide a closed conductive path around a bit storage element. Techniques are also known for balancing bit currents with respect to a differential amplifier. These techniques, however, have not provided a common bit drive sense system with a balanced closed bit drive conductive path around the magnetic film as well as a balanced sense connection to a differential output amplifier.

A problem in the use of a ground plane connection for returning bit drive current is the phenomenon of "current spreading." Instead of returning directly beneath the drive conductor, current tends to spread out over the entire area of the ground plane, reducing the effective field at the selected bit storage elements. In addition, the decay of this current is controlled by the internal resistance and inductance of the substrate.

*Objects*

An object of the invention is to provide a complete closed conductive path around a magnetic film bit storage device in a balanced bit drive sense system.

Another object of the invention is to provide a balanced bit drive sense system for a magnetic film storage device, which system resists the phenomenon of current spreading and its natural decay in the conductive substrate.

*Features*

A feature of the invention is the connection of a metal substrate in the bit drive current path and also in the sense amplifier path, so that a relatively large bit current pulse is directed along a defined metallic current path including the substrate during bit driving.

Another feature of the invention is the connection of balanced bit drive conductors at a single point on one side of the conductive substrate, and the connection of balanced sense conductors at a single point on the opposite side of the conductive substrate, so that the bit drive pulse divides, recombines in the substrate, and divides again before presentation to the output device, thus retaining a high degree of balancing.

Another feature of the invention is the connection of bit drive conductor pairs and sense conductor pairs to a ground plane and to one another for balancing.

*Advantages*

An advantage of the invention is that the sense conductors are balanced with respect to voltages of the bit current, and also with respect to bit noise, without the necessity of complicated or difficult connections.

Another advantage of the invention is the minimization of the effect of current spreading in a conductive substrate.

The foregoing and other objects, features and advantages of the invention will be apparent from the following more particular description of preferred embodiments of the invention as illustrated in the accompanying drawings.

*Drawings*

*Summary*

Figure 1:
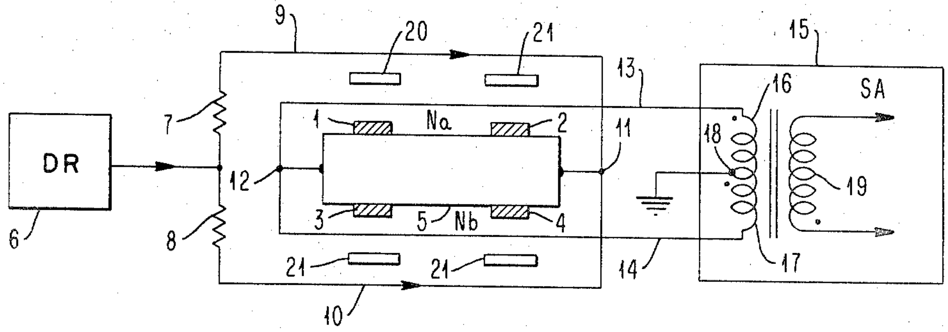
FIGURE 1 is a diagram of a first embodiment of the invention.

The invention is a bit drive sense system which provides common mode noise rejection of the bit signal current in a magnetic film memory.

The interconnection of bit drive conductor pairs 9–10, sense conductor pairs 13–14 and conductive substrate 5 in the defined bit current path permits common mode noise rejection and both minimizes and compensates for current spreading in the conductive substrate.

Magnetic films 1–4 are placed in a balanced pair of rows on the top and bottom of conductive substrate 5. These row pairs are supplied with balanced bit currents from driver 6 through resistances 7 and 8 along balanced bit conductors 9 and 10 which connect to conductive substrate 5 at point 11. The bit current passes through conductive substrate 5 to the ground return of the bit driver, and therefore inductively couples equal voltages along sense conductors 13 and 14 for application to opposite sides of a differential output amplifier 15. In unipolar word, bipolar bit mode, word conductors 20 and 21 provide read and write signals. Word conductor 20 and bit conductor 9, energized coincidently, write a 1 (or a 0) into film 1. Conductor 20, energized for reading, rotates the magnetic orientation of film 1 sufficiently to induce an output signal on sense conductors 9 and 13. This output signal appears at output amplifier 15, while common mode noise is rejected.

*Central substrate embodiment*

FIGURE 1 illustrates an embodiment of the invention utilizing a central conductive substrate upon both sides of which magnetic films are deposited. Magnetic films 1 and 2 are on the top and magnetic films 3 and 4 are on the bottom of metal substrate 5. For an orthogonal mode device, each film is magnetically oriented so as to have an easy axis. Data states 1 and 0 are oppositely polarized easy axis states. Each film requires the combination of a word field transverse to its easy axis and a relatively small bit field in the 1 or 0 direction to rotate it magnetically to the 1 or 0 data states respectively. Reading the film requires only the application of the word field. An examination of voltages produced during the rotation from the data state to a reference state resulting from the word field provides the data values.

Magnetic films 1 and 2 on the top of conductive substrate 5 form a row which may be designated row N*a*. Magnetic films 3 and 4 on the bottom of the conductive substrate 5 form another row N*b*.

Bit current is supplied by bipolar bit driver 6, through resistances 7 and 8 onto bit conductors 9 and 10. Bit conductors 9 and 10 respectively traverse the entire rows N*a* and N*b* respectively and recombine at point 11 for connection to conductive substrate 5. Conductive substrate 5 carries the bit currents from point 11 through its body to point 12. The induced current again divides equally into sense wires 13 and 14, which traverse the films of rows N*a* and N*b* and connect into differential output amplifier 15. Differential output device 15 includes two primaries, 16 and 17, connected together to grounded center tap 18. The output on secondary 19 of the differential output device is the algebraic sum of currents on windings 16 and 17. In an ideal situation, the bit current divides into absolutely even halves along wires 9 and 10 and the induced current is again absolutely even on wires 13 and 14. The current conducted to windings 16 and 17 is equal and cancels, providing a null signal output from secondary winding 19. The physical characteristics of lines 9 and 10 and of lines 13 and 14 are as identical as possible and thus the capacitively coupled transients and inductively coupled transients are likely to be equal and again to balance. The function of the bit drive sense system is to define a bit current path for magnetically biasing a row of magnetic film devices (such a row N*a*) during driving. This produces a null at the output transformer, so as not to saturate the sense amplifier or present an unduly high noise signal. The null results from the connection to a second row, N*b*, paired with row N*a* for the purpose of creating the null. During the time that writing into the memory is being accomplished, a single pair of bit conductors 9–10 is conditioned with current and a single word conductor, such as word conductor 20, is provided with transverse field current.

It is advantageous to perform the write function with as little effect on the output amplifier as possible. Any voltage signals connected to the output amplifier might saturate or tend to extend the recovery of that amplifier. The next sensing operation would be necessarily delayed by the time required for the amplifier to recover. It is also advantageous to reduce the time delay of any current in conductive substrate 5. Such currents have an adverse effect on the time at which a signal may be detected as when coupled to the sense amplifier. The balanced, combined and balanced conductive path to the output device, through conductive substrate 5, prevents amplifier saturation and long electrical recovery time.

During the sensing operation bit driver 6 and bit drive conductors 9 and 10 are affected only to a minimum degree, because of the high impedance of driver 6 and resistances 7 and 8. Bit conductor 9 and sense conductor 13 are again experiencing some transients from currents carried by word conductor 20, but these transients oppose and tend to cancel. Current in word conductor 20, since it is in the transverse direction with respect to the easy axis data condition of magnetic film 1, rotates film 1 magnetically to a reference state essentially perpendicular to the easy axis. The 1 and 0 state of the film is indicated by the polarity of its output at secondary winding 16 of output device 15. Output transformer secondary 19 provides an output signal. Word conductors 21 are not connected to any selected driver; there is no transverse field current on them and thus magnetic films 2, 3 and 4 provide no output. Sense conductor 14 and differential output amplifier primary 17 carry film 1 output signal in the opposite direction.

*Adjacent substrates*

Figure 2:
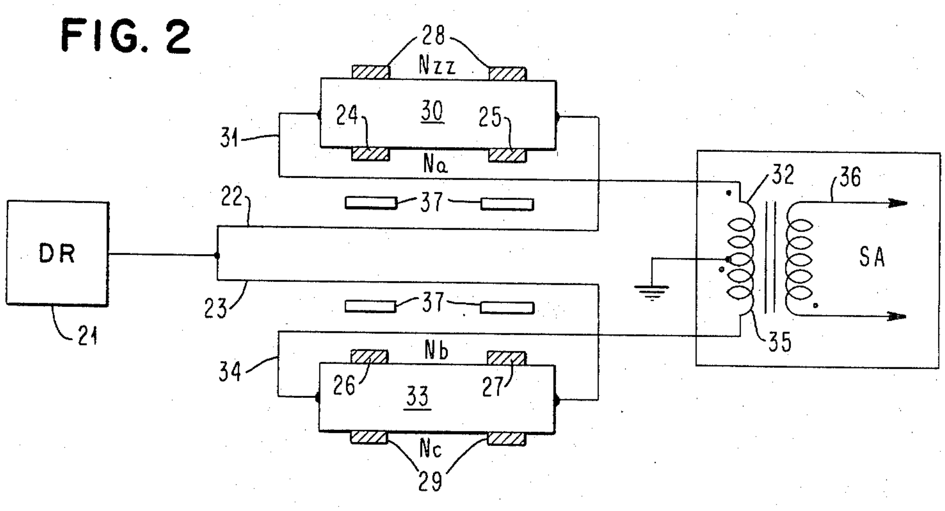
FIGURE 2 is a diagram of a second embodiment of the invention.

FIGURE 2 illustrates second embodiment in which adjacent conductive substrates carry a pair of rows of magnetic film bit storage elements N*a* and N*b*. The connections are fully analogous to the connections of FIGURE 1 and operations is similar.

Bit driver 21 provides a bit driver current pulse which divides equally onto balanced drive conductors 22 and 23. Drive conductor 22 traverses films 24 and 25 of row N*a*; drive conductor 23 traverses films 26 and 27 of row N*b*. Films 28 and 29 form rows N*zz* and N*c*, respectively, which rows are not affected by bit driver 21.

Drive conductor 22 connects through conductive substrate 30 and sense conductor 31 to traverse row N*a* again and connect via output transformer primary 32 to ground. Drive conductor 23 connects through conductive substrate 33 and sense conductor 34 via output transformer primary 35 to ground. The output at secondary 36 of the output transformer is the algebraic sum of currents on primaries 32 and 35. Word drive conductors 37 provide the transverse word fields required for driving and for sensing. The conductive substrates may be of polished copper, silver copper, copper beryllium or other conductive metal, or may be glass with surfaces coated with conductive layers.

Figure 3:
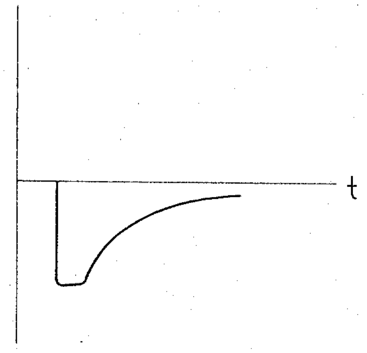
FIGURE 3 is a waveform illustrating the effect of current spreading.

*Current spreading decay—FIGURE 3*

Bit drive current returning through a ground plane is subject to the phenomenon of current spreading. The ground plane current, initially a mirror image of the current in the bit drive conductor, tends to spread out over the entire conductive substrate during the plateau of bit drive pulse. This phenomenon tends toward full equalization, uniform current through a homogeneous ground plane, as the pulse approaches direct current levels. Such current spreading dissipates the induced magnetic flux, applying only a portion of the flux field to the selected bit storage elements and further must be reduced to a small value before sensing may take place.

FIGURE 3 shows the normal slow decay of bit current in a ground plane due to current spreading. The center tapped output transformer and the balanced sense conductor connection permit common mode rejection of any signals resulting from the decay of the currents remaining in the ground plane at the next read interval.

*Operational embodiment*

Figure 4:
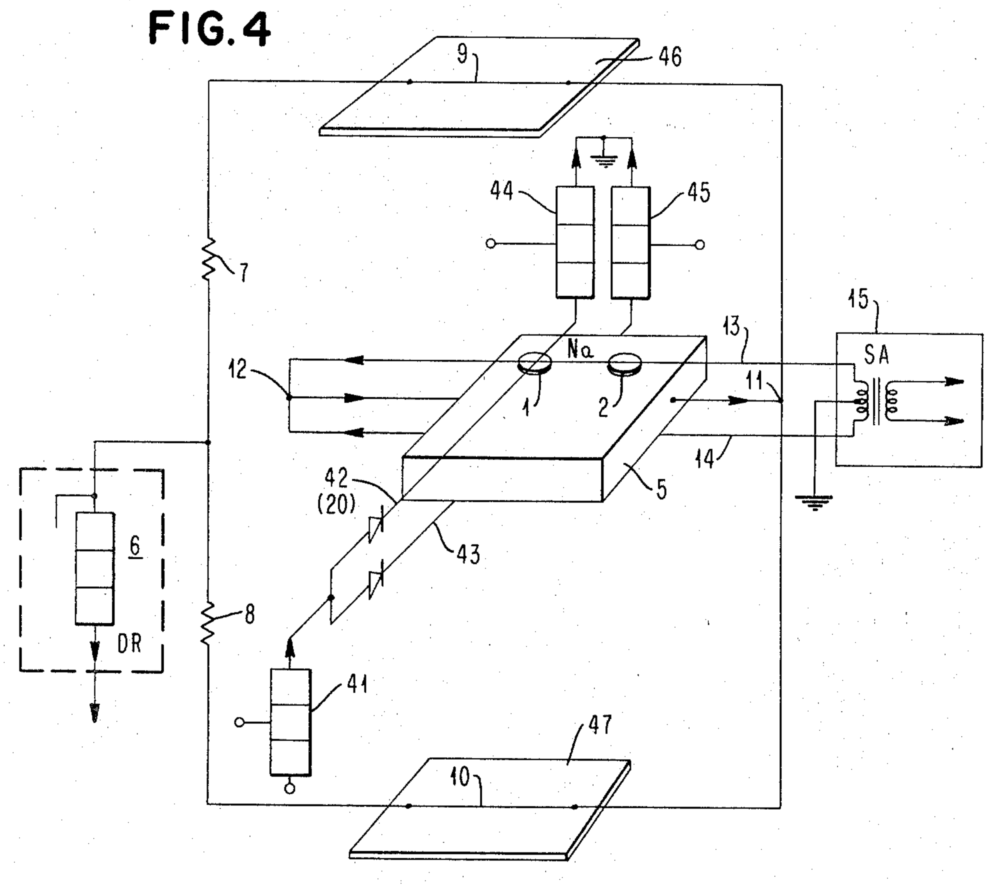
FIGURE 4 is a diagram of a film storage device incorporating the invention of FIGURE 1.

FIGURE 4 shows the invention in an operational embodiment. A word drive system selects a particular word of bit storage elements by energizing its word drive conductor. Connections of the bit drive sense system are similar to FIGURE 1 and retain the same reference characters. Magnetic bit storage elements 1–2, conductive substrate 5, and other elements 6–15 function identically to similarly numbered elements of FIGURE 1. Additional circuitry is shown to select the particular word drive conductor 20. Selection of a particular word driver and word gate selects a word of bit storage elements including a similarly placed bit storage element in each of rows N*a*–N*b*–N*c*–N*d* . . . N*n*. Coincidently driving selected rows and the selected word permits setting of data into the memory. Word drive field alone permits readout of data onto the sense conductors, but regeneration may require energization of a bit driver. Word driver 41 is connected at one side of the matrix to several of word conductors including 42 and 43. These word conductors traverse the bit storage elements and connect to several word gates including 44 and 45 at the other side of the matrix. The word drive circuit functions to provide a current path for only the selected word drive conductor 20. Conductors 9 and 10 are mounted on insulator sheets 46 and 47.

Figure 5:
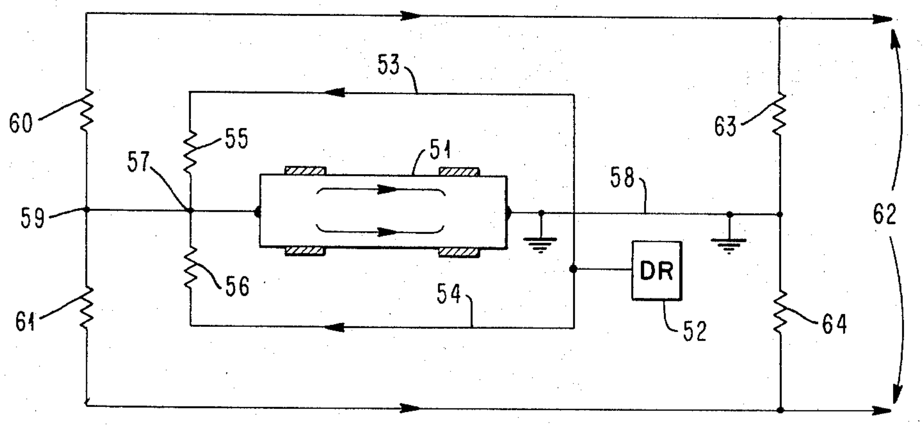
FIGURE 5 is a schematic diagram of a third embodiment of the invention.

*Ground plane embodiment—FIGURE 5*

FIGURE 5 shows a connection using a grounded conductive substrate 51. Bit diver 52 connects to bit conductors 53 and 54 through resistances 55 through 56 to point 57 which connects via ground plane 51 to ground at wire 58. The bit drive pulse also connects from point 57 to point 59 and via resistances 60 and 61 to opposite sides of a differential sense amplifier mounted across resistances 63 and 74 at points 62.

While the invention has been particulary shown and described with reference to preferred embodiments thereof, it will be understood by those skilled in the art that the foregoing and other changes in form and details may be made therein without departing from the spirit and scope of the invention.

What is claimed is:

1. A magnetic storage device having first and second conductive substrate surfaces bearing rows and columns of bit storage elements and having conductors traversing said bit storage elements, column drive means, row drive means, and differential sense amplifiers for receiving signals from associated rows of such bit storage elements, characterized by:

(a) a first sense conductor, connected to said first substrate surface at a first edge, traversing a first row of bit storage elements on said first substrate surface and terminating at a first side of said differential sense amplifier;

(b) a second sense conductor, connected to said second substrate surface at said first edge, traversing a second row of bit storage elements on said second substrate surface and terminating at a second side of said differential sense amplifier;

(c) a first bit conductor connected to said row driver means and traversing said first row of magnetic bit storage elements and connected at a second edge of said surface, opposite said first edge; and (d) a second bit conductor connected to said row driver means and traversing said second row of bit storage elements and connected at said second edge of said substrate surface.

2. A magnetic storage device according to claim 1 wherein said first and second substrate surfaces are opposing surfaces of a single central conductive substrate.

3. A magnetic storage device having first and second conductive substrate surfaces bearing rows and columns of bit storage elements and having conductors traversing said bit storage elements, column drive means, row drive means, and differential sense amplifiers for receiving signals from associated rows of such bit storage elements, characterized by:

(a) a balanced pair of sense conductors traversing a selected pair of rows of bit storage elements in a first direction, connected to said conductive substrate and terminating in opposing sides of a related differential sense amplifier;

(b) a balanced pair of bit drive conductors traversing said selected pair of rows of bit storage elements in a second direction, opposite said first direction, connected to a said row drive means and to said conductive substrate.

References Cited

UNITED STATES PATENTS

| | | | |
|---|---|---|---|
| 3,144,641 | 8/1964 | Raffel | 340—174 |
| 3,209,333 | 9/1965 | Russell | 340—174 |
| 3,293,626 | 12/1966 | Thome | 340—174 |
| 3,319,233 | 5/1967 | Amemiya et al. | 340—174 |

BERNARD KONICK, *Primary Examiner.*

V. P. CANNEY, *Assistant Examiner.*